(12) United States Patent
Lin et al.

(10) Patent No.: US 7,513,695 B1
(45) Date of Patent: Apr. 7, 2009

(54) SMALL FORM FACTOR, FIELD-INSTALLABLE OPTICAL FIBER CONNECTOR

(75) Inventors: I En Lin, Taipei (TW); Tomoyuki Mamiya, Marlboro, MA (US)

(73) Assignees: Protai Photonic Co., Ltd., Taipei (TW); Senko Advanced Components, Inc, Marlboro, MA (US)

( * ) Notice: Subject to any disclaimer, the term of this patent is extended or adjusted under 35 U.S.C. 154(b) by 15 days.

(21) Appl. No.: 11/869,542

(22) Filed: Oct. 9, 2007

(51) Int. Cl.
*G02B 6/36* (2006.01)

(52) U.S. Cl. .............................. 385/78; 385/81; 385/83; 385/87

(58) Field of Classification Search ........................ None
See application file for complete search history.

(56) References Cited

U.S. PATENT DOCUMENTS 6,318,903 B1  11/2001  Andrews et al.

| | | | |
|---|---|---|---|
| 2001/0002220 A1* | 5/2001 | Throckmorton et al. | 385/66 |
| 2005/0036744 A1* | 2/2005 | Caveney et al. | 385/87 |
| 2005/0094945 A1* | 5/2005 | Danley et al. | 385/78 |
| 2005/0213890 A1* | 9/2005 | Barnes et al. | 385/55 |
| 2005/0244108 A1* | 11/2005 | Billman et al. | 385/60 |
| 2006/0002662 A1 | 1/2006 | Manning et al. | |
| 2006/0018604 A1* | 1/2006 | Bareel et al. | 385/78 |

* cited by examiner

*Primary Examiner*—Sung H Pak
*Assistant Examiner*—Mike Stahl (57) ABSTRACT

An optical fiber connector includes a connector housing, a ferrule and a clamping assembly. The connector hosing has a front end and a rear end. The ferrule is disposed in the connector housing and projects from the front end of the connector housing. The clamping assembly is disposed in the connector housing for mounting the ferrule, and includes a hollow housing and a cam member, wherein the cam member includes a groove adapted to clamp a terminating fiber when a cam effect between the hollow housing and the cam member is generated and further the cam effect causes the groove of the cam member to generate a clamping force.

26 Claims, 7 Drawing Sheets

SMALL FORM FACTOR, FIELD-INSTALLABLE OPTICAL FIBER CONNECTOR

BACKGROUND OF THE INVENTION

1. Field of the Invention

The present invention generally relates to an optical fiber connector, and more particularly to an optical fiber connector including a clamping assembly having a groove of a cam member, which can generate a clamping force and be adapted to clamp a terminating fiber.

2. Description of the Related Art

Recently, optical fibers have been widely used as signal transmission media because of their high bandwidth and low loss nature. In order to transmit over a longer distance, it is common to use a high power diode laser to launch a laser beam into the optical fiber. An optical fiber connector is a mechanical device disposed at an end of the optical fiber and acts as a connector of optical path when the optical fibers are joined to each other.

Figure 1:
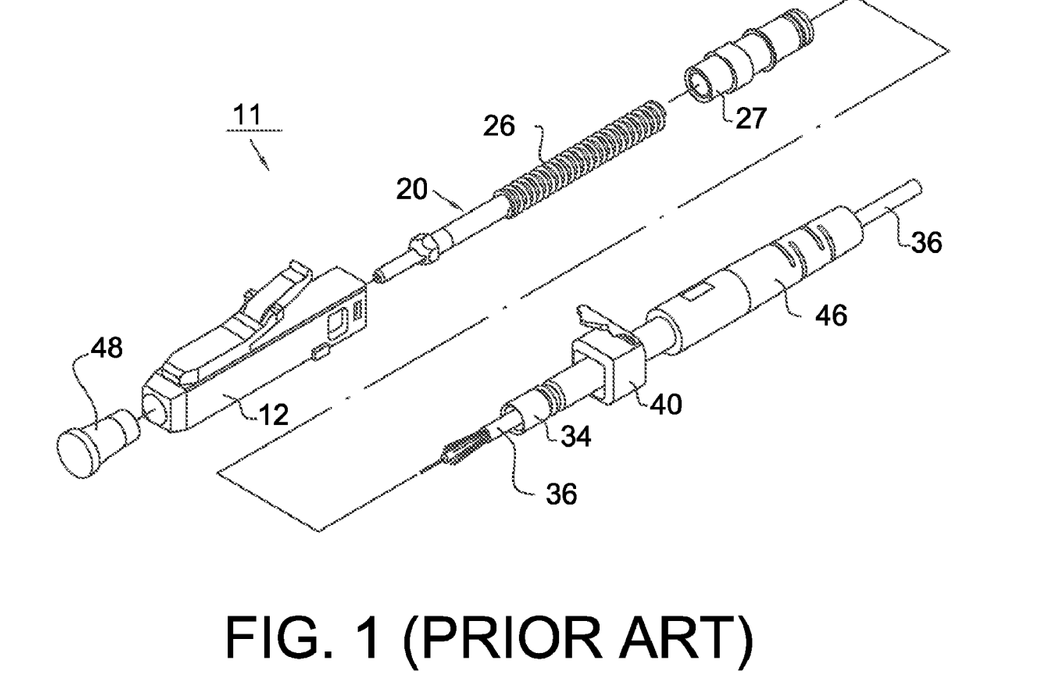
FIG. 1 is an exploded perspective schematic view of an optical fiber connector in the prior art, showing a small form factor, factory-installable optical fiber connector.
Figure 2:
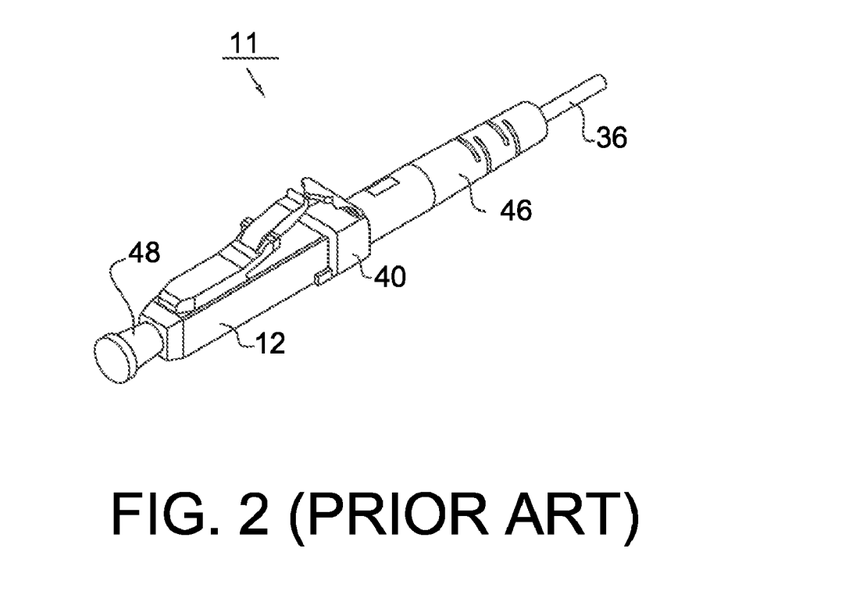
FIG. 2 is a perspective schematic view of the optical fiber connector of FIG. 1 after assembly.

A conventional small form factor, optical fiber connector must be readily assembled in the factory, and there are too many separated components so as to have a complex processes of assembly. For example, referring to FIG. 1, U.S. Pat. No. 6,318,903 B1, entitled "Optical fiber connector for backplane" discloses an optical fiber connector 11 including a protective dust cap 48, a connector housing 12, a ferrule-barrel assembly 20, a coil spring 26, an insert 27, a crimping member 34, a clip member 40, a protective boot 46 and an incoming fiber cable 36, which are assembled in sequence so as to finish the optical fiber connector 11 shown in FIG. 2.

In order to effect optical coupling and minimize the Fresnel loss, the end of the optical fiber is commonly presented for mating in a polished ferrule. The Fresnel loss is a loss of light quantity between interfaces of two mediums when the light is transmitted from a medium to another medium. In the factory, a polished ferrule assembly is most readily prepared in a controlled setting, wherein precision equipment and skilled craftsmen are available for cleaving the optical fiber, and terminating it in a ferrule, and polishing the ferrule and the optical fiber to exacting tolerances.

However, there is a need for an optical fiber connector that can be installed in the field where such facilities and craftsmen are not available. Under these conditions, it is desirable to omit the step of the polishing the ferrule/optical fiber in the field by instead terminating the optical fiber in an optical fiber connector which has a fiber stub already terminated and polished in a ferrule. Then, a terminating fiber of an incoming fiber cable is optically coupled to the fiber stub in the optical fiber connector, often with the use of a refractive index matched gel to improve optical coupling therebetween.

Figure 3:
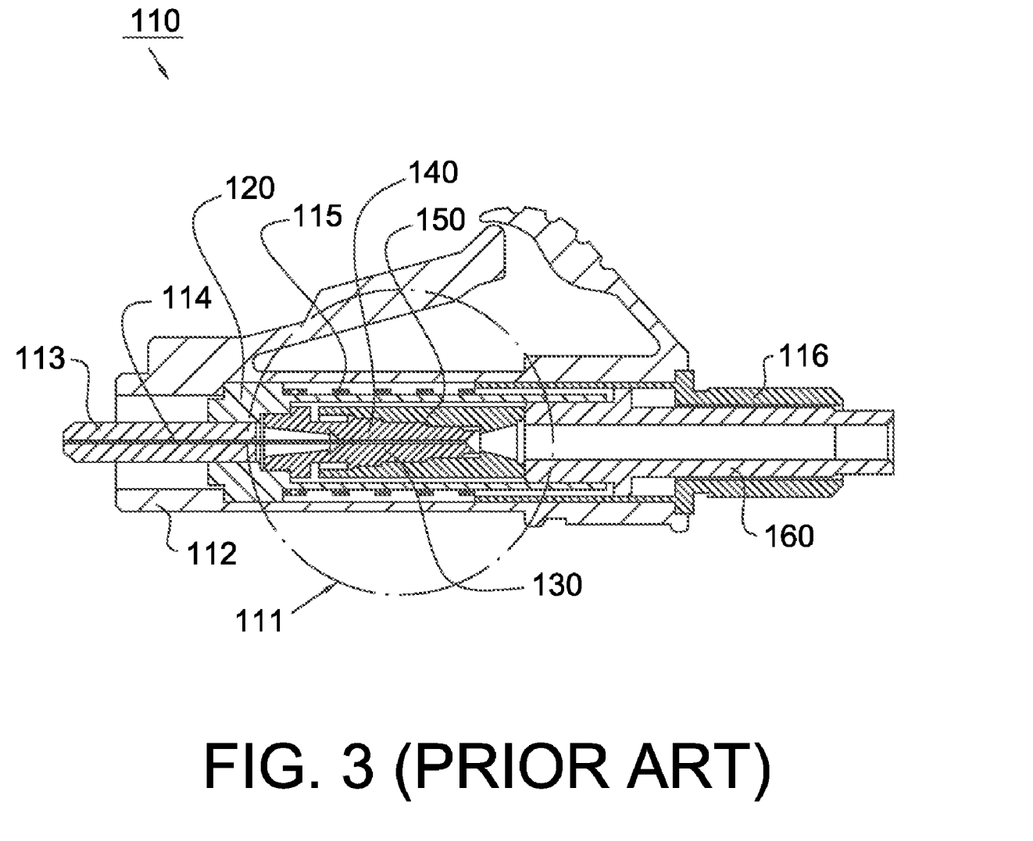
FIG. 3 is cross-sectional schematic view of another optical fiber connector in the prior art, showing a small form factor, field-installable optical fiber connector.

For example, referring to FIG. 3, U.S. Patent Publication Number 2006/0002662 A1, entitled "Small Form Factor, Field-Installable Connector" discloses a small form factor, field-installable optical fiber connector 110 including a connector housing 112, a ferrule 113, a clamping assembly 111, a resilient member 115 and a rear body 116. The ferrule 113 is disposed in the connector housing 112. A fiber stub 114 is already terminated, polished in a ferrule 113, and mounted in the ferrule 113 by means of a conventional adhesive, e.g. epoxy. Then, a terminating fiber (not shown) is optically coupled to the fiber stub 114 in the optical fiber connector 110. The clamping assembly 111 is disposed in the connector housing 112 and located behind the ferrule 113. The clamping assembly 111 includes a housing 120, a platform 130, first and second cam members 140, 150 and an actuator 160, wherein all the platform 130, the first and second cam members 140, 150 and the actuator 160 are disposed in the housing 120. Since the actuator 160 forces the second cam member 150 forward relative to the first cam members 140, a cam effect between the first and second cam members 140, 150 is generated and further a clamping action between the platform 130 and the first cam members 140 is generated so as to receive and retain the terminating fiber, i.e. the terminating fiber cannot escape from the optical fiber connector 110. The resilient member 115 is disposed in the connector housing 112. The rear body 116 is disposed at the rear end of the connector housing 112 and configured to provide a backstop against which the resilient member 115 can press to bias the ferrule 113 and the clamping assembly 111 forward.

However, it is difficult to rework for the terminating fiber disclosed in U.S. Patent Publication Number 2006/0002662 A1. Once the installation of the terminating fiber is wrong, the terminating fiber must be pulled out from the optical fiber connector by a tool. Furthermore, the clamping assembly disclosed by U.S. Patent Publication Number 2006/0002662 A1 is a complex structure.

Accordingly, there exists a need for an optical fiber connector capable of solving the above-mentioned problems.

SUMMARY OF THE INVENTION

It is an object of the present invention to provide an optical fiber connector including a clamping assembly having a groove of a cam member, which can generates a clamping force and be adapted to clamp a terminating fiber.

In order to achieve the foregoing object, the present invention provides an optical fiber connector including a connector housing, a ferrule and a clamping assembly. The connector hosing has a front end and a rear end. The ferrule is disposed in the connector housing and projects from the front end of the connector housing. The clamping assembly is disposed in the connector housing for mounting the ferrule, and includes a hollow housing and a cam member, wherein the cam member includes a groove adapted to clamp a terminating fiber when a cam effect between the hollow housing and the cam member is generated and further the cam effect causes the groove of the cam member to generate a clamping force.

According to the optical fiber connector of the present invention, it is easy to rework for the terminating fiber disclosed in the present invention. Once the installation of the terminating fiber is wrong, the terminating fiber can be pulled out from the optical fiber connector by a hand with/without a tool. Compared with the prior art, the clamping assembly of the present invention is a simple structure and is easily used.

The foregoing, as well as additional objects, features and advantages of the invention will be more apparent from the following detailed description, which proceeds with reference to the accompanying drawings.

DETAILED DESCRIPTION OF THE PREFERRED EMBODIMENT

Figure 4:
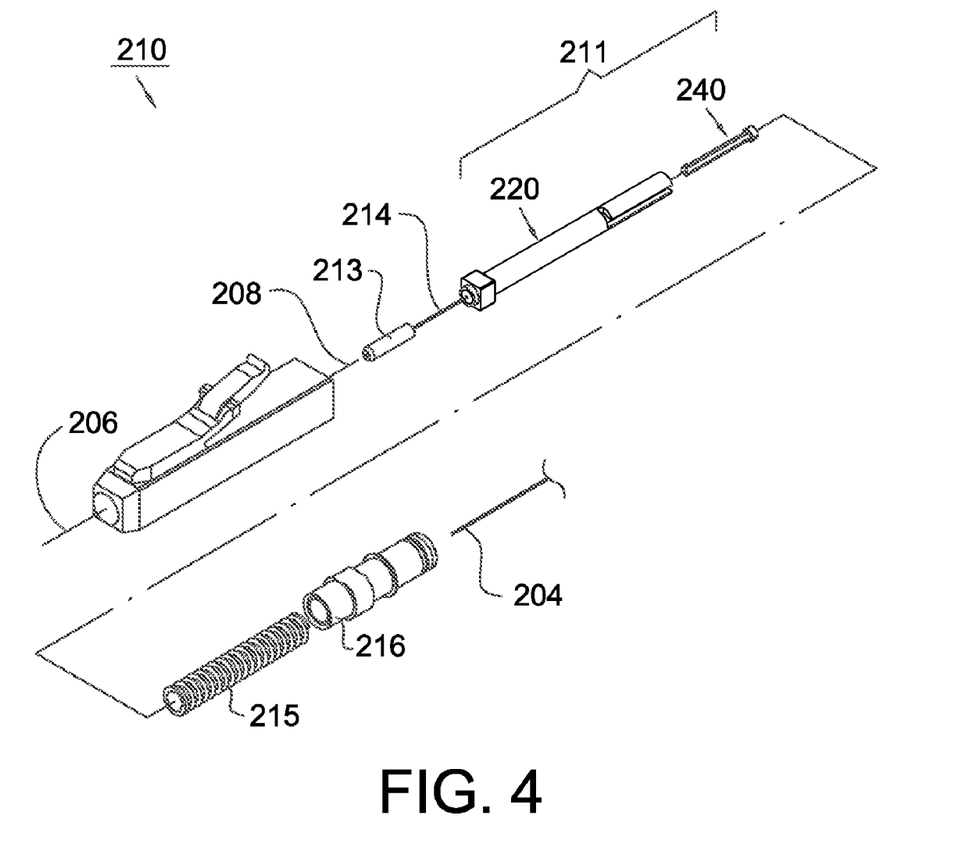
FIG. 4 is an exploded perspective schematic view of an optical fiber connector according to an embodiment of the present invention.
Figure 5:
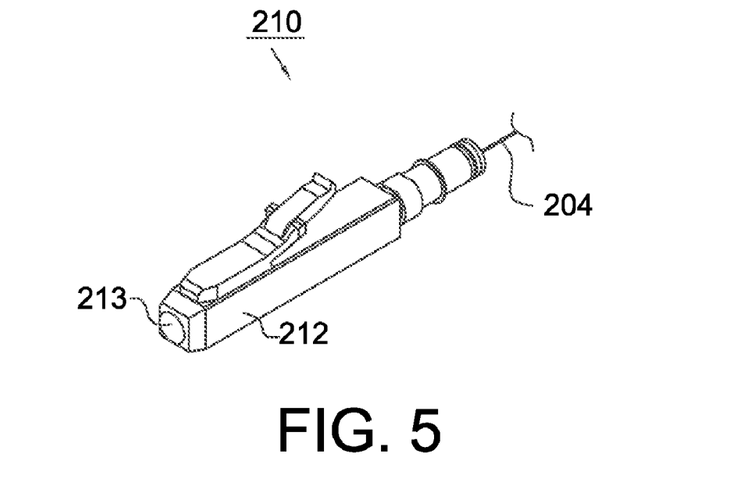
FIG. 5 is a perspective schematic view of the optical fiber connector of FIG. 4 after assembly.
Figure 6:
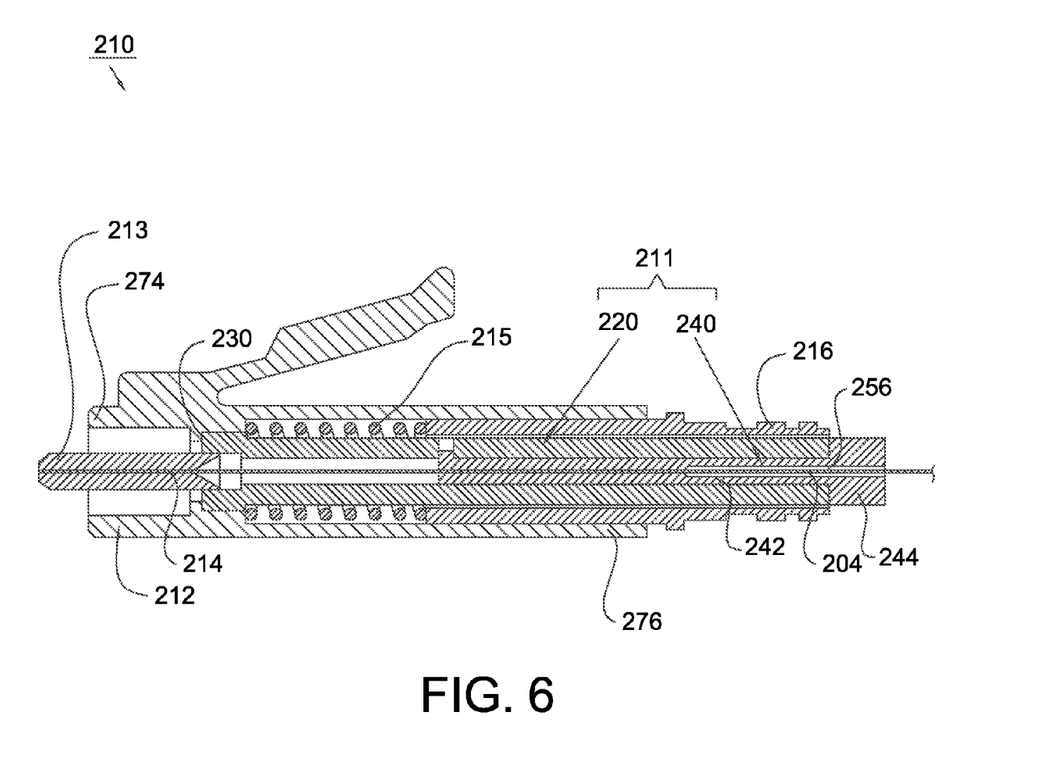
FIG. 6 is a cross-sectional schematic view of the optical fiber connector of FIG. 4 after assembly.

Referring to FIGS. 4 to 6, they depict an optical fiber connector 210 according to an embodiment of the present invention. The optical fiber connector 210 can be a kind of small form factor, field-installable optical fiber connector, or a kind of small form factor, factory-installable optical fiber connector. In this embodiment, the optical fiber connector 210 which is the small form factor, field-installable optical fiber connector is discussed in greater detail below.

The optical fiber connector 210 includes a connector housing 212, a ferrule 213, a clamping assembly 211, a resilient member 215 and an insert member 216. The connector housing 212 can be a small form factor housing and defines a front orientation 206 and a back orientation 208. The ferrule 213 is disposed in the connector housing 212 and projects from a front end 274 of the connector housing 212 along the front orientation 206. A fiber stub 214 is already terminated, polished in a ferrule 213, and mounted in the ferrule 213 by means of a conventional adhesive, e.g. epoxy. Then, a terminating fiber 204 of an incoming fiber cable is optically coupled to the fiber stub 214 in the optical fiber connector 210, often with the use of a refractive index matched gel to improve optical coupling therebetween. The clamping assembly 211 is disposed in the connector housing 212 for mounting the ferrule 213, and is adapted for clamping the terminating fiber 204, i.e. the terminating fiber 204 cannot escape from the optical fiber connector 110.

Figure 7:
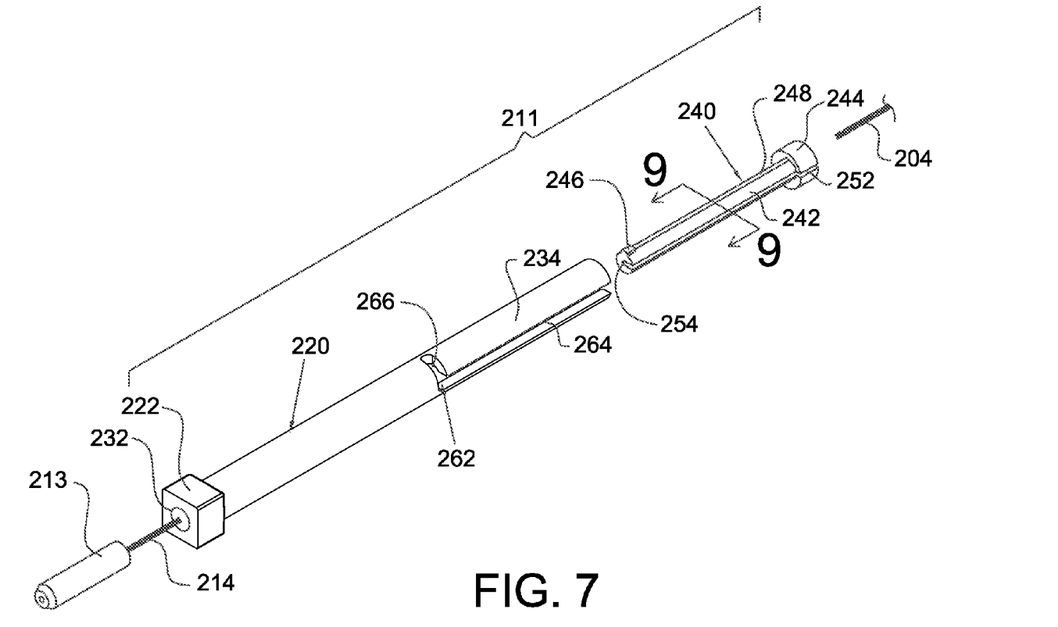
FIG. 7 is an exploded perspective schematic view of a clamping assembly according to the embodiment of the present invention.
Figure 8:
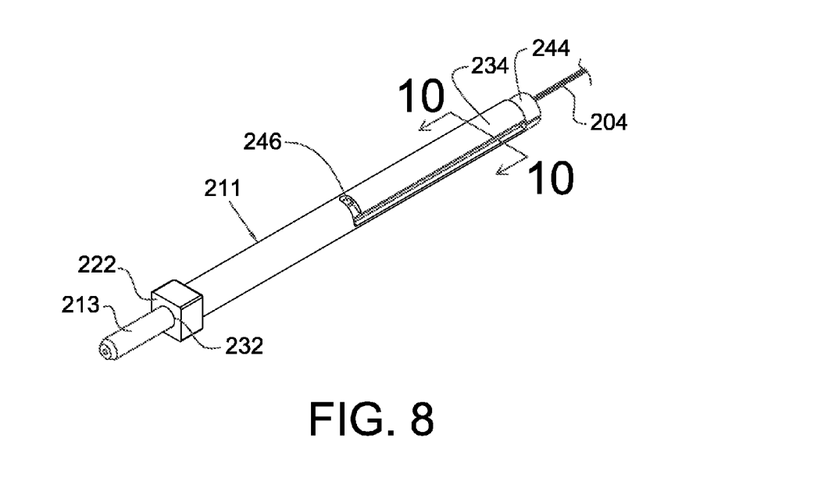
FIG. 8 is a perspective schematic view of the clamping assembly of FIG. 7 after assembly.

Referring to FIGS. 7 and 8, the clamping assembly 211 includes a hollow housing 220 and a cam member 240. After assembly, the front portion 232 of the hollow housing 220 can be adapted to mount the ferrule 213, and cause the ferrule 213 to align with the clamping assembly 211 along the front orientation 206. Also, the front portion 232 of the hollow housing 220 has an annular flange 222, which contacts the resilient member 215 and is adapted for stopping the hollow housing 220 on the inner wall 230 of the connector housing 212 (shown in FIG. 6). Also, the hollow housing 220 has an L-shaped opening 262 which is located at the rear portion 232 thereof, and the L-shaped opening 262 is a through opening and includes a first opening 264 and a second opening 266.

Figure 9:
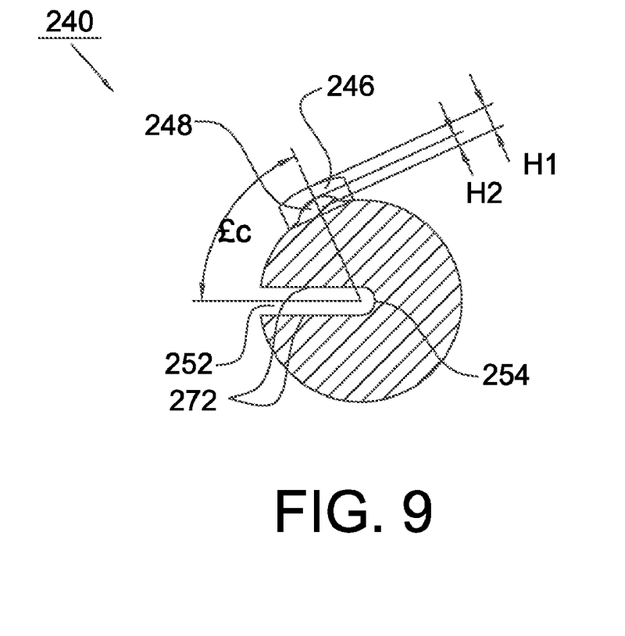
FIG. 9 is a cross-sectional schematic view of the cam member along line 9-9 of FIG. 7.

The cam member 240 includes a cylindrical portion 242 and a holding portion 244, wherein the cylindrical portion 242 is physically connected to the holding portion 244. After the clamping assembly 211 is assembled, the cylindrical portion 242 is disposed in the rear portion 234 of the hollow housing 220, and the holding portion 244 is exposed out from the rear portion 234 of the hollow housing 220. The diameter of the cylindrical portion 242 is equal to or slightly less than the inner diameter of the rear portion 234 of the hollow housing 220 (shown in FIG. 6). Referring to FIG. 7 again, the front end of the cylindrical portion 242 is provided with a first protrusion 246, e.g. rectangular or circular lump-shaped protrusion, and the surface of the cylindrical portion 242 is provided with a second protrusion 248, e.g. arc bar-shaped protrusion. The second protrusion 248 and the first protrusion 246 define a direction, which is parallel to the back orientation 208 of the connector housing 212, and the second protrusion 248 can be physically connected to the first protrusion 246. Referring FIG. 9, the height H1 of the first protrusion 246 can be more than the height H2 of the second protrusion 248. The height H1 of the first protrusion 246 can be equal to or less than the difference between the outer radius and the inner radius of the rear portion 234 of the hollow housing 220. The height H2 of the second protrusion 248 can be equal to or less than a half of the difference between the outer radius and the inner radius of the rear portion 234 of the hollow housing 220. The cam member 240 further includes a U-shaped groove 252, which passes through a half of volumes of the cylindrical portion 242 and the holding portion 244, respectively. The space of the first bottom 254 of the U-shaped groove 252 is equal to or slightly bigger than the volume of the terminating fiber 204, whereby the U-shaped groove 252 accommodates the terminating fiber 204 during installation. Also, the space of the second bottom 256 of the U-shaped groove 252 is bigger than the volume of the terminating fiber 204, wherein the space of the second bottom 256 is bigger than the space of the first bottom 254, whereby the insert member 216 cannot harmfully pressurize the terminating fiber 204 after installation (shown in FIG. 6).

Figure 10:
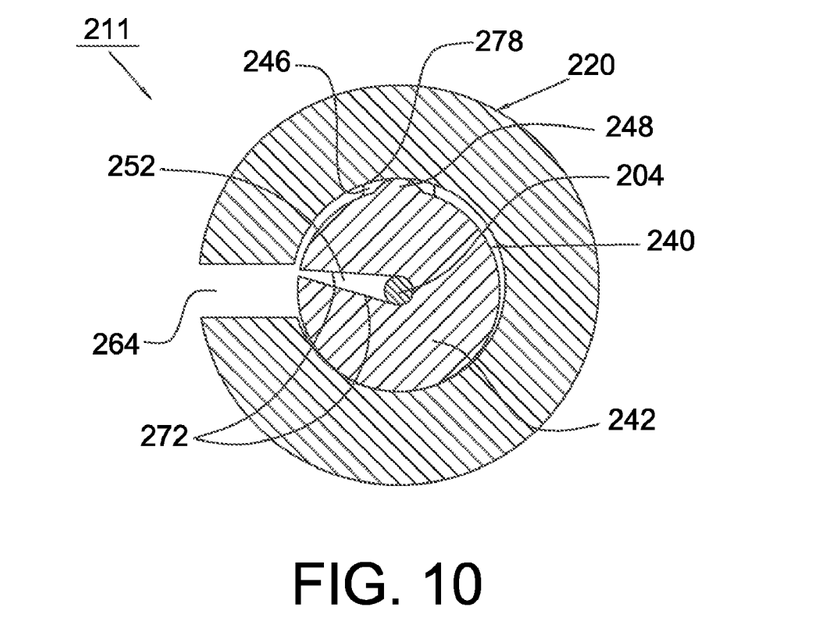
FIG. 10 is a cross-sectional schematic view of the clamping assembly along line 10-10 of FIG. 8.

More detailed, during assembly of the optical fiber connector in the field, the first protrusion 246 is moved along the first opening 264 of the L-shaped opening 262, and simultaneously the cylindrical portion 242 is inserted into the rear portion 234 of the hollow housing 220. The space of the first bottom 254 of the U-shaped groove 252 has accommodated a part of the fiber stub 214. Then, the terminating fiber 204 is inserted into the spaces of the bottom 254, 256 of the U-shaped groove 252 and is optically coupled to the fiber stub 214. Finally, the holding portion 244 of the cam member 240 is turned (e.g. clockwise), i.e. the first protrusion 246 is moved along the second opening 266 of the L-shaped opening 262 so as to position the cam member 240 and to prevent the cam member 240 from slip. Simultaneously, the inner wall 278 of the hollow housing 220 compresses the second protrusion 248, and thus a cam effect (i.e. the first cam effect) between the hollow housing 220 and the first cam member 240 is generated and further the cam effect causes two sides 272 of the U-shaped groove 252 of the cam member 240 to generate a clamping force so as to clamp the terminating fiber 204, shown in FIG. 10. Referring to FIG. 9 again, a predetermined angle $\theta$ is formed between the orientations the U-shaped groove 252 and the second protrusion 248. The predetermined angle $\theta$ can affect the clamping force, and is not more than 71.5 degrees. Furthermore, if the optical fiber connector is requested to be disassembled in the field, the above-mentioned clamping processes will be contrarily carried out. For example, the holding portion 244 of the cam member 240 is turned (e.g. anticlockwise) so as to loosen the terminating fiber 204. In addition, if the terminating fiber 204 is not a symmetrical circle of 360 degrees (e.g. the terminating fiber 204 is a polarizing fiber), the cam member 240 can be turned to the necessary angle.

Figure 11A:
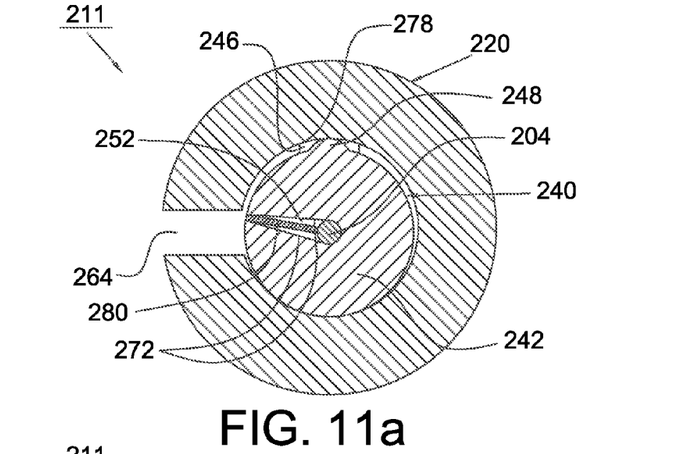
FIG. 11a is a cross-sectional schematic view of the clamping assembly of the present invention, showing that the cam member further includes a sheet element.

Referring to FIG. 11a, the cam member 240 further includes a sheet element 280. After the terminating fiber 204 is inserted into the spaces of the bottom 254, 256 of the U-shaped groove 252, the sheet element 280 is put in the U-shaped groove 252 and contacts the terminating fiber 204. Then, the holding portion 244 of the cam member 240 is turned so as to drive the cylindrical portion 242 to be turned. Specifically, the cam effect causes two sides 272 of the U-shaped groove 252 of the cam member 240 to generate a clamping force so as to clamp the terminating fiber 204 and the sheet element 280. The sheet element 280 can be adapted to effectively mount the terminating fiber 204 in the optical fiber connector, and prevents the terminating fiber 204 from moving. The size of the sheet element 280 is not bigger than the size of the U-shaped groove 252. For example, before the holding portion 244 of the cam member 240 is turned, the thickness of the sheet element 280 is not bigger than the distance between the two sides 272 of the U-shaped groove 252, the length of the sheet element 280 is not bigger than the length of the U-shaped groove 252, and the width of the sheet element 280 is not bigger than the difference between the depth of the U-shaped groove 252 and the diameter of the terminating fiber 204. Preferably, the thickness of the sheet element 280 is equal to a half of the distance between the two sides 272 of the U-shaped groove 252.

Figure 11B:
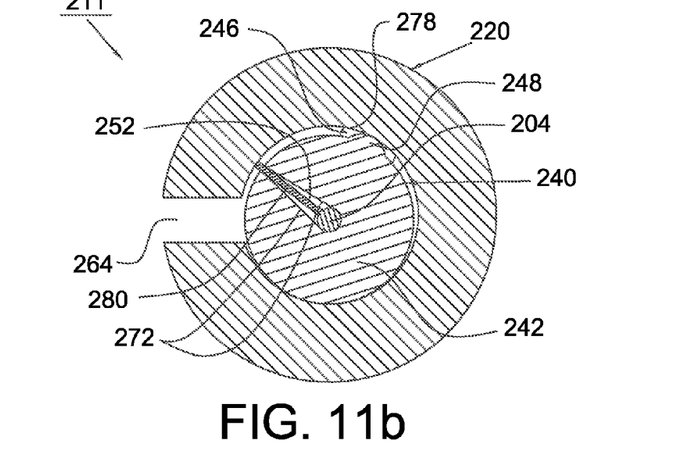
FIG. 11b is a cross-sectional schematic view of the clamping assembly of the present invention, showing that the width of the sheet element of the cam member is bigger than the difference between the depth of the U-shaped groove and the diameter of the terminating fiber.

Otherwise, referring to FIG. 11b, in an alternative embodiment, the width of the sheet element 280 is bigger than the difference between the depth of the U-shaped groove 252 and the diameter of the terminating fiber 204. When the cylindrical portion 242 of the cam member 240 is turned, the inner wall 278 of the hollow housing 220 compresses the sheet element 280 and thus another cam effect (i.e. the second cam effect) between the hollow housing 220 and the cam member 240 is generated. The second cam effect also causes the sheet element 280 to generate a clamping force so as to clamp the terminating fiber 204. Furthermore, in another alternative embodiment, the present invention can independently provide the second cam effect by only using the sheet element 280 without the second protrusion 248, thereby clamping the terminating fiber 204.

Figure 12:
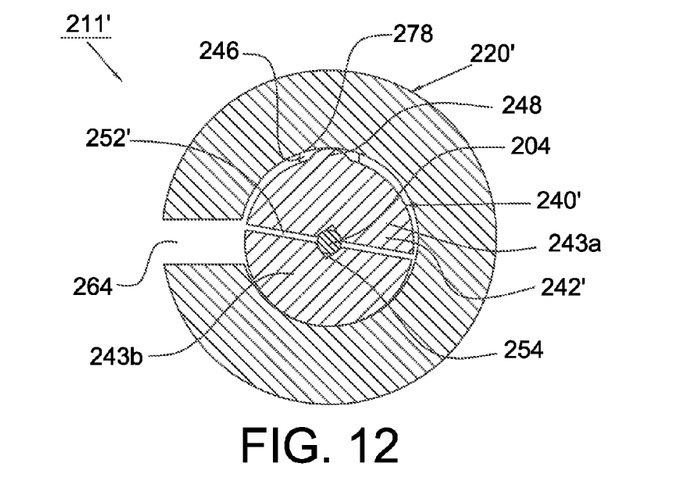
FIG. 12 is a cross-sectional schematic view of a clamping assembly according to an alternative embodiment of the present invention.

Referring to FIG. 12, it depicts a clamping assembly 211' according to an alternative embodiment of the present invention. The clamping assembly 211' is substantially similar to the clamping assembly 211, wherein the similar elements are designated with the similar reference numerals. The clamping assembly 211' includes a hollow housing 220' and a cam member 240'. The difference between the clamping assembly 211' and the clamping assembly 211 is that the cam member 240' includes a through groove 252' rather than a U-shaped groove 252. The through groove 252' passes through all volumes of the cylindrical portion 242' and the holding portion (not shown), respectively. In other words, the cylindrical portion 242' and the holding portion are constituted by a first portion 243a and a second portion 243b. The space of the intermediate region 254' of the through groove 252' is equal to or slightly bigger than the volume of the terminating fiber 204, whereby the through groove 252' accommodates the terminating fiber 204 during installation. More detailed, the champing and assembling processes of the clamping assembly 211' is substantially similar to those of the clamping assembly 211 in the field.

According to the optical fiber connector of the present invention, it is easy to rework for the terminating fiber disclosed in the present invention. Once the installation of the terminating fiber is wrong, the terminating fiber can be pulled out from the optical fiber connector by a hand with/without a tool. Compared with the prior art, the clamping assembly of the present invention is a simple structure and is easily used.

Referring to FIG. 6 again, the resilient member 215, e.g. spring, is disposed in the connector housing 212, and encloses the hollow housing 220. The insert member 216 is disposed in the rear end 276 of the connector housing 212 (e.g. a part of the insert member 216 is screwedly mounted in the rear end 276 of the connector housing 212), and exposes out a part of the clamping assembly (i.e. the holding portion 244 of the cam member 240), wherein during assembly of the optical fiber connector the resilient member 215 can press to bias the ferrule 213 and the clamping assembly 211 forward so as to finish the optical fiber connector 210.

In addition, if the optical fiber connector 210 is a small form factor, factory-installable optical fiber connector, the ferrule 213 of the optical fiber connector 210 is not provided with the fiber stub 214. In other words, the terminating fiber 204 of the factory-installable optical fiber connector will be extended to the original location of the fiber stub 214 of the field-installable optical fiber connector. Thus, the method for assembling the small form factor, factory-installable optical fiber connector has no step adapted for optically coupling the terminating fiber 204 to the fiber stub 214.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An optical fiber connector comprising:
    a connector housing having a front end and a rear end;
    a ferrule disposed in the connector housing and projects from the front end of the connector housing; and
    a clamping assembly disposed in the connector housing for mounting the ferrule, and comprising a hollow housing and a cam member, wherein the hollow housing has a rear portion, and the cam member includes:
        a groove adapted to clamp a terminating fiber when a cam effect between the hollow housing and the cam member is generated and further the cam effect causes the groove of the cam member to generate a clamping force;
        a holding portion exposed out from the rear portion of the hollow housing and the rear portion of the connector housing; and
        a cylindrical portion physically connected to the holding portion and disposed in the rear portion of the hollow housing.

2. The optical fiber connector as claimed in claim 1, wherein the diameter of the cylindrical portion is equal to the inner diameter of the rear portion of the hollow housing.

3. The optical fiber connector as claimed in claim 1, wherein the hollow housing has an L-shaped opening being a through opening and including a first opening and a second opening, the cylindrical portion is provided with a first protrusion, and the first protrusion is moved along the first and second openings of the L-shaped opening so as to position the cam member.

4. The optical fiber connector as claimed in claim 3, wherein the first protrusion is rectangular or circular lump-shaped protrusion.

5. The optical fiber connector as claimed in claim 3, wherein the height of the first protrusion is not more than the difference between the outer radius and the inner radius of the rear portion of the hollow housing.

6. The optical fiber connector as claimed in claim 3, wherein the cylindrical portion is provided with a second protrusion, and the hollow housing has an inner wall adapted to compress the second protrusion, whereby a cam effect between the hollow housing and the first cam member is generated.

7. The optical fiber connector as claimed in claim 6, wherein the second protrusion is an arc bar-shaped protrusion.

8. The optical fiber connector as claimed in claim 6, wherein the height of the first protrusion is more than the height of the second protrusion.

9. The optical fiber connector as claimed in claim 6, wherein the height of the second protrusion is not more than a half of the difference between the outer radius and the inner radius of the rear portion of the hollow housing.

10. The optical fiber connector as claimed in claim 6, wherein the groove is a U-shaped groove.

11. The optical fiber connector as claimed in claim 10, wherein the U-shaped groove passes through a half of volumes of the cylindrical portion and the holding portion, respectively.

12. The optical fiber connector as claimed in claim 10, wherein the U-shaped groove includes a first bottom, which has a space is equal to the volume of the terminating fiber.

13. The optical fiber connector as claimed in claim 12, wherein the U-shaped groove further includes a second bottom, which is bigger than the space of the first bottom.

14. The optical fiber connector as claimed in claim 10, wherein a predetermined angle is formed between the orientations the U-shaped groove and the second protrusion, wherein the predetermined angle affects the clamping force.

15. The optical fiber connector as claimed in claim 14, wherein the predetermined angle is not more than 71.5 degrees.

16. The optical fiber connector as claimed in claim 10, wherein the cam member further includes a sheet element, which is put in the U-shaped groove and contacts the terminating fiber.

17. The optical fiber connector as claimed in claim 16, wherein the size of the sheet element is not bigger than the size of the U-shaped groove.

18. The optical fiber connector as claimed in claim 17, wherein the width of the sheet element is not bigger than the difference between the depth of the U-shaped groove and the diameter of the terminating fiber.

19. The optical fiber connector as claimed in claim 17, wherein the width of the sheet element is bigger than the difference between the depth of the U-shaped groove and the diameter of the terminating fiber.

20. The optical fiber connector as claimed in claim 17, wherein the thickness of the sheet element is equal to a half of the distance between the two sides of the U-shaped groove.

21. The optical fiber connector as claimed in claim 10, wherein the cam member further includes a sheet element, which is put in the U-shaped groove and contacts the terminating fiber, and the width of the sheet element is bigger than the difference between the depth of the U-shaped groove and the diameter of the terminating fiber.

22. The optical fiber connector as claimed in claim 6, wherein the groove is a through groove.

23. The optical fiber connector as claimed in claim 22, wherein the through groove passes through all volumes of the cylindrical portion and the holding portion, respectively.

24. The optical fiber connector as claimed in claim 22, wherein the cylindrical portion and the holding portion are constituted by a first portion and a second portion.

25. The optical fiber connector as claimed in claim 1, further comprising:
a resilient member disposed in the connector housing and enclosing the hollow housing; and
an insert member disposed in the rear end of the connector housing and exposing out a part of the clamping assembly, wherein during assembly of the optical fiber connector the resilient member adapted to press to bias the ferrule and the clamping assembly forward.

26. The optical fiber connector as claimed in claim 1, further comprising:
a fiber stub mounted in the ferrule.

* * * * *